(12) United States Patent
Matsumoto

(10) Patent No.: US 7,931,301 B2
(45) Date of Patent: Apr. 26, 2011

(54) TRAVELING VEHICLE

(75) Inventor: Kunihiko Matsumoto, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 640 days.

(21) Appl. No.: 11/915,087

(22) PCT Filed: May 18, 2006

(86) PCT No.: PCT/JP2006/309967
§ 371 (c)(1),
(2), (4) Date: Jan. 11, 2008

(87) PCT Pub. No.: WO2006/123756
PCT Pub. Date: Nov. 23, 2006

(65) Prior Publication Data
US 2009/0101657 A1 Apr. 23, 2009

(30) Foreign Application Priority Data

| May 20, 2005 | (JP) | 2005-147549 |
| May 20, 2005 | (JP) | 2005-147550 |
| Jun. 7, 2005 | (JP) | 2005-166968 |

(51) Int. Cl.
*B60P 3/00* (2006.01)
(52) U.S. Cl. .............. 280/834; 180/68.1; 180/89.12
(58) Field of Classification Search .......... 180/68.1, 180/69.4, 69.21, 346, 900, 311, 312, 90, 180/89.1, 89.12, 89.13, 89.14; 280/562, 280/830, 833, 834; 296/193.07, 193.09, 296/203.02, 204; 220/562
See application file for complete search history.

(56) References Cited

U.S. PATENT DOCUMENTS

| 2,314,298 A | * | 3/1943 | Welch | 280/833 |
| 2,569,494 A | * | 10/1951 | Prior | 280/833 |
| 3,311,183 A | * | 3/1967 | Phillips | 180/54.1 |
| 3,774,803 A | * | 11/1973 | Bombardier | 220/746 |
| 3,918,540 A | * | 11/1975 | Haupt | 180/69.2 |
| 4,081,050 A | * | 3/1978 | Hennessey et al. | 180/233 |
| 4,214,767 A | * | 7/1980 | Davies, III | 280/834 |

(Continued)

FOREIGN PATENT DOCUMENTS
EP 0067570 * 12/1982
(Continued)

OTHER PUBLICATIONS

Supplementary European Search Report for European Application No. EP06746634, European Patent Office dated Dec. 15, 2008, 2 pgs.

(Continued)

*Primary Examiner* — Hau V Phan
*Assistant Examiner* — Brodie Follman
(74) *Attorney, Agent, or Firm* — Sterne, Kessler, Goldstein & Fox, P.L.L.C.

(57) ABSTRACT

The purpose of the present invention is to make supplying fuel to a fuel tank easier without making the fuel tank interfere with a drive shaft or a front wheel drive shaft and without lowering the minimum ground clearance of a traveling vehicle. A fuel tank is disposed between an engine and a seat and below a steering wheel, and a groove is provided longitudinally at the substantial lateral center of the fuel tank. A power steering valve is attached to the lower portion of the steering wheel, and grooves in which hydraulic pipings connected to the power steering valve are arranged are formed in the fuel tank.

17 Claims, 10 Drawing Sheets

U.S. PATENT DOCUMENTS

| | | | | |
|---|---|---|---|---|
| 4,223,899 A * | 9/1980 | Krieger | | 280/834 |
| 4,444,373 A * | 4/1984 | Hayashi | | 248/544 |
| 4,480,845 A * | 11/1984 | Hansen | | 280/834 |
| 4,506,756 A * | 3/1985 | Bergous | | 180/291 |
| 4,685,529 A * | 8/1987 | Tamura et al. | | 180/89.12 |
| 4,723,810 A | 2/1988 | Kanemaru et al. | | |
| 4,737,067 A * | 4/1988 | Samejima et al. | | 414/686 |
| 4,930,811 A * | 6/1990 | Tsukada et al. | | 280/834 |
| 5,113,819 A * | 5/1992 | Murakawa et al. | | 123/198 E |
| 5,186,324 A * | 2/1993 | Brandon, Jr. | | 206/223 |
| 5,207,187 A * | 5/1993 | Kurohara et al. | | 123/41.7 |
| 5,248,237 A * | 9/1993 | Nakamura | | 414/686 |
| 5,405,167 A * | 4/1995 | Lee | | 280/830 |
| 5,887,671 A * | 3/1999 | Yuki et al. | | 180/68.1 |
| 6,030,029 A * | 2/2000 | Tsuda et al. | | 296/203.02 |
| 6,068,295 A * | 5/2000 | Skabrond et al. | | 280/775 |
| 6,092,854 A * | 7/2000 | Campbell | | 296/70 |
| 6,135,306 A * | 10/2000 | Clayton et al. | | 220/564 |
| 6,186,547 B1 * | 2/2001 | Skabrond et al. | | 280/775 |
| 6,203,065 B1 * | 3/2001 | Batton | | 280/830 |
| 6,378,823 B1 * | 4/2002 | Edholm | | 248/219.4 |
| 6,508,323 B2 * | 1/2003 | Burgo | | 180/69.21 |
| 6,711,839 B1 * | 3/2004 | Kawamura et al. | | 37/466 |
| 6,758,301 B2 * | 7/2004 | Shiba et al. | | 180/383 |
| 6,886,861 B2 * | 5/2005 | Marsala et al. | | 280/834 |
| 7,036,625 B2 * | 5/2006 | Aldridge et al. | | 180/442 |
| 7,044,504 B2 * | 5/2006 | Studebaker et al. | | 280/783 |
| 7,213,542 B2 * | 5/2007 | Oshima et al. | | 123/41.51 |
| 7,213,667 B2 * | 5/2007 | Goebert et al. | | 180/68.1 |
| 7,464,782 B2 * | 12/2008 | Hirakawa et al. | | 180/89.12 |
| 7,475,750 B2 * | 1/2009 | Tokuhara | | 180/69.2 |
| 7,533,904 B2 * | 5/2009 | Koike et al. | | 280/834 |
| 7,558,658 B2 * | 7/2009 | Kuramoto et al. | | 701/50 |
| 7,562,736 B2 * | 7/2009 | Eguchi et al. | | 180/291 |
| 7,604,277 B2 * | 10/2009 | Matsumoto et al. | | 296/71 |
| 7,758,075 B2 * | 7/2010 | Isayama et al. | | 280/834 |
| 7,770,932 B2 * | 8/2010 | Lin | | 280/834 |
| 2002/0096377 A1 * | 7/2002 | Kuji et al. | | 180/68.3 |
| 2002/0112907 A1 * | 8/2002 | Maeda et al. | | 180/69.4 |
| 2003/0057005 A1 * | 3/2003 | Nagai et al. | | 180/68.1 |
| 2003/0136602 A1 * | 7/2003 | Tsuda | | 180/312 |
| 2004/0118627 A1 * | 6/2004 | Ohtsuki et al. | | 180/312 |
| 2004/0129467 A1 * | 7/2004 | Tsuruta et al. | | 180/68.1 |
| 2005/0127078 A1 * | 6/2005 | Vorenkamp et al. | | 220/562 |
| 2005/0257972 A1 * | 11/2005 | Iwami et al. | | 180/68.1 |
| 2006/0006635 A1 * | 1/2006 | Sonderegger | | 280/830 |
| 2006/0027408 A1 * | 2/2006 | Hirakawa et al. | | 180/89.12 |
| 2006/0151505 A1 * | 7/2006 | Kobayashi | | 220/562 |
| 2006/0243505 A1 * | 11/2006 | Kuramoto et al. | | 180/89.12 |
| 2006/0278451 A1 * | 12/2006 | Takahashi et al. | | 180/68.1 |
| 2007/0114814 A1 * | 5/2007 | Ichikawa | | 296/193.09 |
| 2007/0169975 A1 * | 7/2007 | Kubota | | 180/69.4 |
| 2008/0078598 A1 * | 4/2008 | Essinger et al. | | 180/69.4 |
| 2008/0106112 A1 * | 5/2008 | Shibaoka et al. | | 296/71 |
| 2008/0302805 A1 * | 12/2008 | Komorida et al. | | 220/562 |
| 2009/0007719 A1 * | 1/2009 | Shibaoka et al. | | 74/543 |
| 2009/0294209 A1 * | 12/2009 | Bluhm | | 180/446 |
| 2010/0089674 A1 * | 4/2010 | Oka et al. | | 180/68.1 |
| 2010/0187238 A1 * | 7/2010 | Schoenherr | | 220/562 |

FOREIGN PATENT DOCUMENTS

| | | |
|---|---|---|
| JP | 58-156018 | 10/1983 |
| JP | 2-82680 | 6/1990 |
| JP | 3-143775 | 6/1991 |
| JP | 3-55500 | 12/1991 |
| JP | 10-325373 | 12/1998 |
| JP | 2000-282993 | 10/2000 |
| JP | 2002-29273 | 1/2002 |

OTHER PUBLICATIONS

International Search Report for International Application No. PCT/JP2006/309967, Japanese Patent Office, mailed Jul. 18, 2006, 2 pgs.

* cited by examiner

TRAVELING VEHICLE

BACKGROUND OF THE INVENTION

1. Field of the Invention

The present invention relates to a traveling vehicle such as a tractor. Especially, the present invention relates to the shape and arrangement of a fuel tank mounted on a traveling vehicle and arrangement of a fuel filler of the fuel tank.

2. Background Art

Conventionally, with regard to a traveling vehicle such as a tractor, there is well known structure that a fuel tank is disposed just before a steering wheel at an upper rear portion of a bonnet of the front portion of the traveling vehicle (for example, see the Patent Literature 1). There is also well known structure that a fuel tank is disposed at the rear end of the vehicle body between left and right rear wheels and before a seat (for example, see the Patent Literature 2).

Recently, a structure was proposed that a fuel tank is disposed below a step (for example, see the Patent Literature 3).

Patent Literature 1: the Japanese Patent Laid Open Gazette Hei. 10-325373.

Patent Literature 2: the Japanese Utility Model Laid Open Gazette Sho. 58-156018.

Patent Literature 3: the Japanese Patent Laid Open Gazette 2002-29273.

SUMMARY OF THE INVENTION

Problems to Be Solved by the Invention

With regard to the first structure, the fuel tank is arranged near the engine so that associated equipments such as a fuel hose and a fuel pump are arranged intensively. However, the position of the fuel filler of the fuel tank becomes comparatively high and it is necessary to hang up a fuel supply tank high for supplying fuel to the fuel tank. Furthermore, in the case that cooling air is introduced from the behind the vehicle, heat air touches the fuel tank, whereby it is necessary to arrange a partition or heat insulating material. With regard to the second structure, the center of gravity of the traveling vehicle is positioned in the rear portion of the traveling vehicle. Accordingly, in the case that a heavy thing such as a working machine is attached through an elevating link to the rear portion of the traveling vehicle, the whole traveling vehicle becomes unbalanced. With regard to the third structure disposing the fuel tank below the step, the minimum ground clearance of the traveling vehicle is lowered so that the lower portion of the traveling vehicle may interfere with and damage crops.

The reason why the fuel tank is disposed in such a position is to prevent the fuel tank from interfering with a drive shaft connecting an engine to a transmission casing and a front wheel drive shaft connecting the transmission casing to a front axle.

The present invention provides a construction in which fuel can be supplied to a fuel tank while mounting a fuel supply tank on a step without lowering minimum ground clearance of a traveling vehicle by using effectively a space in a lower portion of a dashboard and below the dashboard.

Means for Solving the Problems

According to the present invention, with regard to a traveling vehicle comprising an engine supported on a body frame and a fuel tank between the engine and a seat for supplying fuel, the fuel tank is disposed below a steering wheel and below a vertical middle portion of a dashboard.

With regard to the traveling vehicle according to the present invention, a part or all of the fuel tank is covered by a part of the dashboard when viewed from the side.

With regard to the traveling vehicle according to the present invention, the fuel tank is positioned directly below the dashboard.

With regard to the traveling vehicle according to the present invention, a part or all of the fuel tank is covered by a front portion of a step of the traveling vehicle when viewed from the side.

According to the present invention, with regard to a traveling vehicle comprising an engine supported on a body frame and a fuel tank for supplying fuel to the engine wherein cooling air is introduced from behind the vehicle, an intake port is formed in a rear surface of a dashboard; a power steering valve is connected to a steering wheel; and the fuel tank and a battery are disposed below the power steering valve.

According to the present invention, with regard to a traveling vehicle comprising an engine supported on a body frame and a fuel tank between the engine and a seat for supplying fuel, the fuel tank is disposed below a steering wheel; and a fuel filler of the fuel tank is disposed below a vertical middle portion of a dashboard.

With regard to the traveling vehicle according to the present invention, the fuel filler is positioned directly above a step.

With regard to the traveling vehicle according to the present invention, the fuel filler is disposed before a longitudinal middle portion of the dashboard.

With regard to the traveling vehicle according to the present invention, an opening part for the fuel filler is provided in the dashboard.

With regard to the traveling vehicle according to the present invention, the fuel filler is disposed before a bracket for a front loader.

According to the present invention, with regard to a traveling vehicle comprising an engine and a fuel tank for supplying fuel, the fuel tank is disposed between the engine and a seat and below a steering wheel 6; and a groove is provided longitudinally at a substantial lateral center of the fuel tank.

With regard to the traveling vehicle according to the present invention, a power steering valve is attached to a lower portion of the steering wheel, and a groove in which a hydraulic piping connected to the power steering valve is arranged is formed in the fuel tank.

With regard to the traveling vehicle according to the present invention, the power steering valve is attached to the lower portion of the steering wheel, and a rear surface of the fuel tank is slanted from an upper front portion to a lower rear portion.

With regard to the traveling vehicle according to the present invention, a lower surface of the fuel tank is supported by a support member hanged laterally on a body frame.

With regard to the traveling vehicle according to the present invention, a part or all of the support member overlaps a part or all of the rear surface of the fuel tank when viewed m rear.

With regard to the traveling vehicle according to the present invention, extending parts are formed leftward and rightward from side surfaces of the fuel tank, and lower surfaces of the extending parts are supported by the body frame.

Effect of the Invention

According to the present invention, with regard to a traveling vehicle comprising an engine supported on a body frame and a fuel tank between the engine and a seat for supplying fuel, the fuel tank is disposed below a steering wheel and below a vertical middle portion of a dashboard.

Accordingly, the space in the lower portion of the dashboard or below the dashboard can be used effectively. The fuel tank can be arranged at the comparative low position without lowering the minimum ground clearance of the traveling vehicle, whereby fuel can be supplied easily from a fuel supply tank to the fuel tank.

A part or all of the fuel tank is covered by a part of the dashboard when viewed from the side.

Accordingly, the space in the lower portion of the dashboard or below the dashboard can be used effectively. The fuel tank can be arranged at the comparative low position without lowering the minimum ground clearance of the traveling vehicle, whereby fuel can be supplied easily from a fuel supply tank to the fuel tank.

The fuel tank is positioned directly below the dashboard.

Accordingly, the space in the lower portion of the dashboard or below the dashboard can be used effectively. The fuel tank can be arranged at the comparative low position without lowering the minimum ground clearance of the traveling vehicle, whereby fuel can be supplied easily from a fuel supply tank to the fuel tank.

A part or all of the fuel tank is covered by a front portion of a step of the traveling vehicle when viewed from the side.

Accordingly, fuel can be supplied to the fuel tank while a fuel supply tank is placed on the step so that the height to which the fuel supply tank is lifted up is fallen compared with the conventional construction, whereby the manpower is reduced and the fuel supply work becomes easy. Furthermore, interference from an obstacle to the side surface of the fuel tank is prevented by the step.

With regard to a traveling vehicle comprising an engine supported on a body frame and a fuel tank for supplying fuel to the engine wherein cooling air is introduced from behind the vehicle, an intake port is formed in a rear surface of a dashboard; a power steering valve is connected to a steering wheel; and the fuel tank and a battery are disposed below the power steering valve.

Accordingly, since cooling air is introduced from the behind the vehicle, the fuel tank, the power steering valve and the battery are cooled simultaneously with the engine to prevent the temperature from rising. Since a radiator or the like is arranged between the engine and the fuel tank, a partition member arranged therebetween can be constructed easily or can be omitted.

With regard to a traveling vehicle comprising an engine supported on a body frame and a fuel tank between the engine and a seat for supplying fuel, the fuel tank is disposed below a steering wheel; and a fuel filler of the fuel tank is disposed below a vertical middle portion of a dashboard.

Accordingly, the height to which the fuel supply tank has to be lifted up is fallen compared with the conventional construction, whereby the manpower is reduced and the fuel supply work becomes easy.

The fuel filler is positioned directly above a step.

Accordingly, fuel can be supplied to the fuel tank while a fuel supply tank is placed on the step so that the height to which the fuel supply tank is lifted up is lower than that which is required with the conventional construction, whereby the manpower is reduced and the fuel supply work becomes easy. Furthermore, interference from an obstacle to the side surface of the fuel tank is prevented by the step.

The fuel filler is disposed before a longitudinal middle portion of the dashboard.

Accordingly, the fuel filler, which extends from the fuel tank, does not interfere with the battery and the hydraulic pipings disposed in the dashboard.

An opening part for the fuel filler is provided in the dashboard.

Accordingly, fuel can be supplied to the fuel tank while a fuel supply tank is placed on the step so that the height to which the fuel supply tank is lifted up is lower than that which is required with the conventional construction, whereby the manpower is reduced and the fuel supply work becomes easy. Furthermore, interference from an obstacle to the side surface of the fuel tank is prevented by the step.

The fuel filler is disposed before a bracket for a front loader.

Accordingly, the front loader does not interfere with a boom at the time of attaching the front loader or lifting down the front loader to the lowest position. Furthermore, the fuel filler is hidden behind the brackets when viewed from the front so that an obstacle or a tree in front of the vehicle is prevented from touching the fuel filler at the time of traveling.

With regard to a traveling vehicle comprising an engine and a fuel tank for supplying fuel, the fuel tank is disposed between the engine and a seat and below a steering wheel 6; and a groove is provided longitudinally at a substantial lateral center of the fuel tank.

Accordingly, the fuel tank can be arranged at the comparative low position without making the fuel tank interfere with the drive shaft and without lowering the minimum ground clearance of the traveling vehicle, whereby fuel can be supplied while an oil supply tank is placed on the step so that fuel supply work to the fuel tank becomes easy.

A power steering valve is attached to a lower portion of the steering wheel, and a groove in which a hydraulic piping connected to the power steering valve is arranged is formed in the fuel tank.

Accordingly, the number of support members fixing the hydraulic pipings is reduced, whereby the number of parts is reduced.

The power steering valve is attached to the lower portion of the steering wheel, and a rear surface of the fuel tank is slanted from an upper front portion to a lower rear portion.

Accordingly, the hydraulic pipings are guided smoothly from the power steering valve above the fuel tank to the hydraulic casing behind the fuel tank.

A lower surface of the fuel tank is supported by a support member hanged laterally on a body frame.

Accordingly, the support members reinforce the body frames while supporting the fuel tank, whereby the number of parts is reduced.

A part or all of the support member overlaps a part or all of the rear surface of the fuel tank when viewed from the rear. Accordingly, the fuel tank is prevented from moving rearward.

Extending parts are formed leftward and rightward from side surfaces of the fuel tank, and lower surfaces of the extending parts are supported by the body frame.

Accordingly, it is not necessary to provide any support member for the fuel tank separately in the bonnet to prevent the support member from interfering with the other members in the bonnet, whereby the degree of freedom of design inside the bonnet is improved.

BRIEF DESCRIPTION OF THE DRAWINGS/FIGURES

DETAILED DESCRIPTION OF THE INVENTION

Explanation will be given on an embodiment of the present invention.

Figure 1:
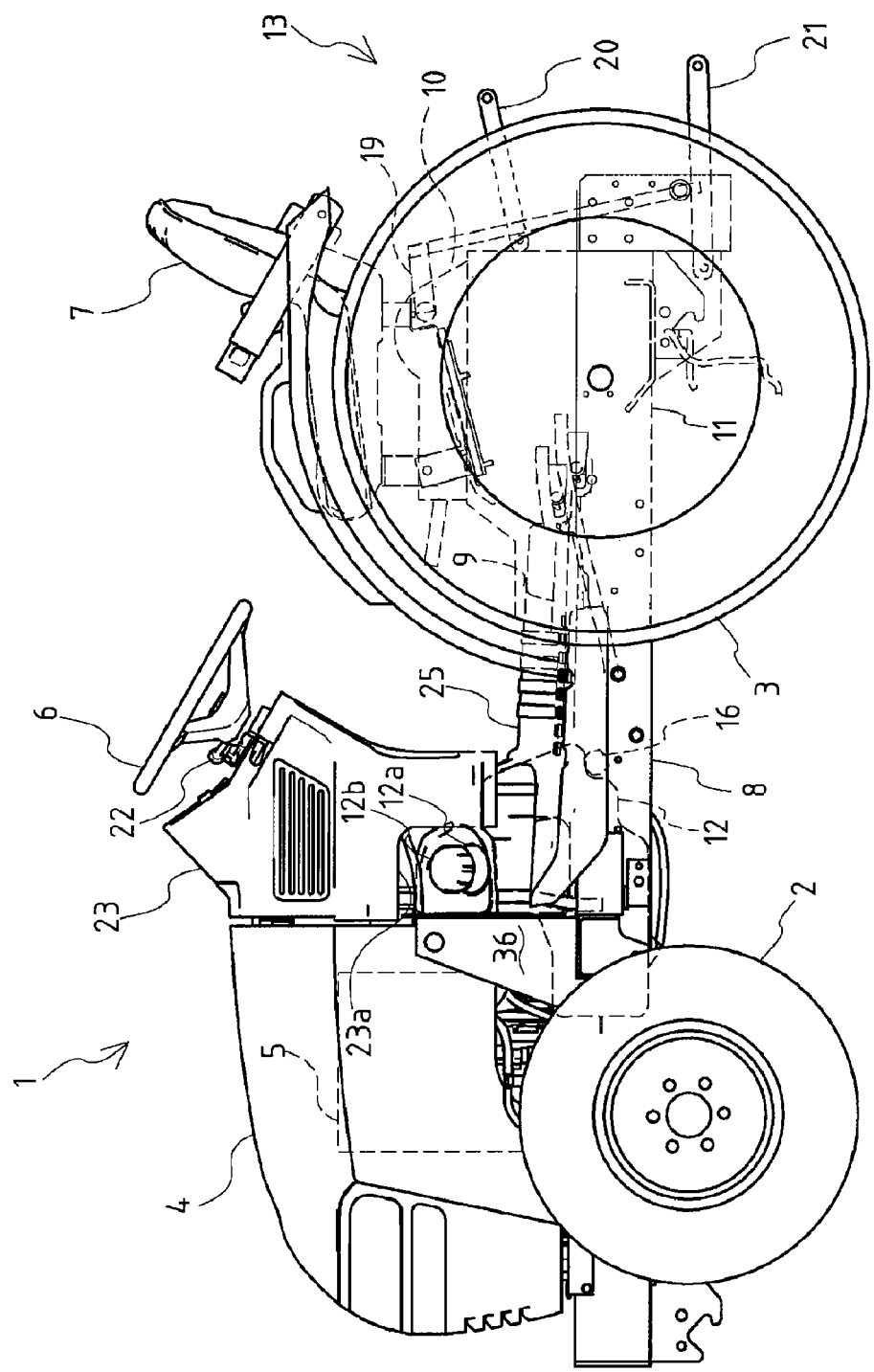
FIG. 1 is a left side view of the entire construction of a tractor 1 according to an embodiment of a traveling vehicle of the present invention.
Figure 2:
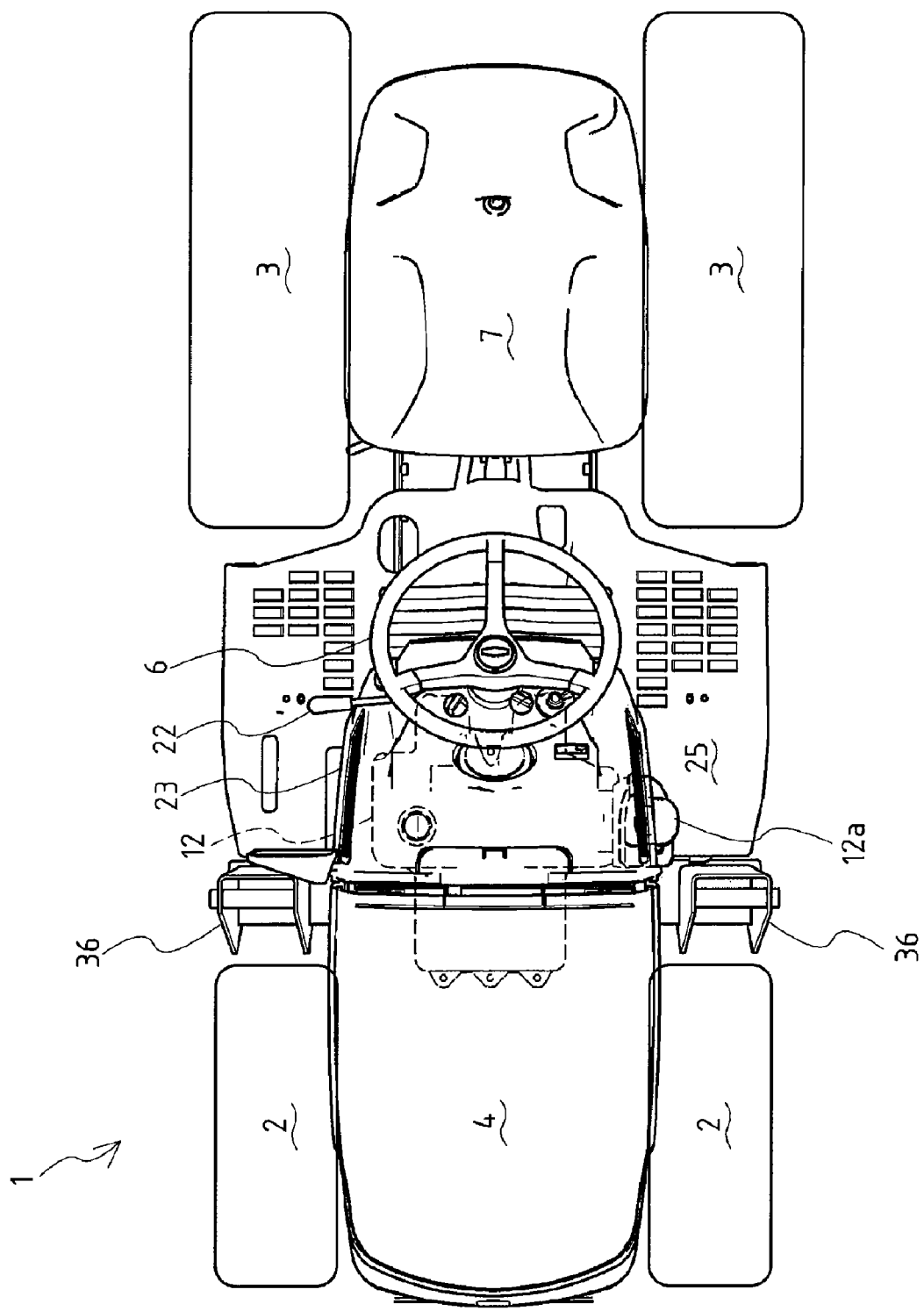
FIG. 2 is a plan view of the same.
Figure 3:
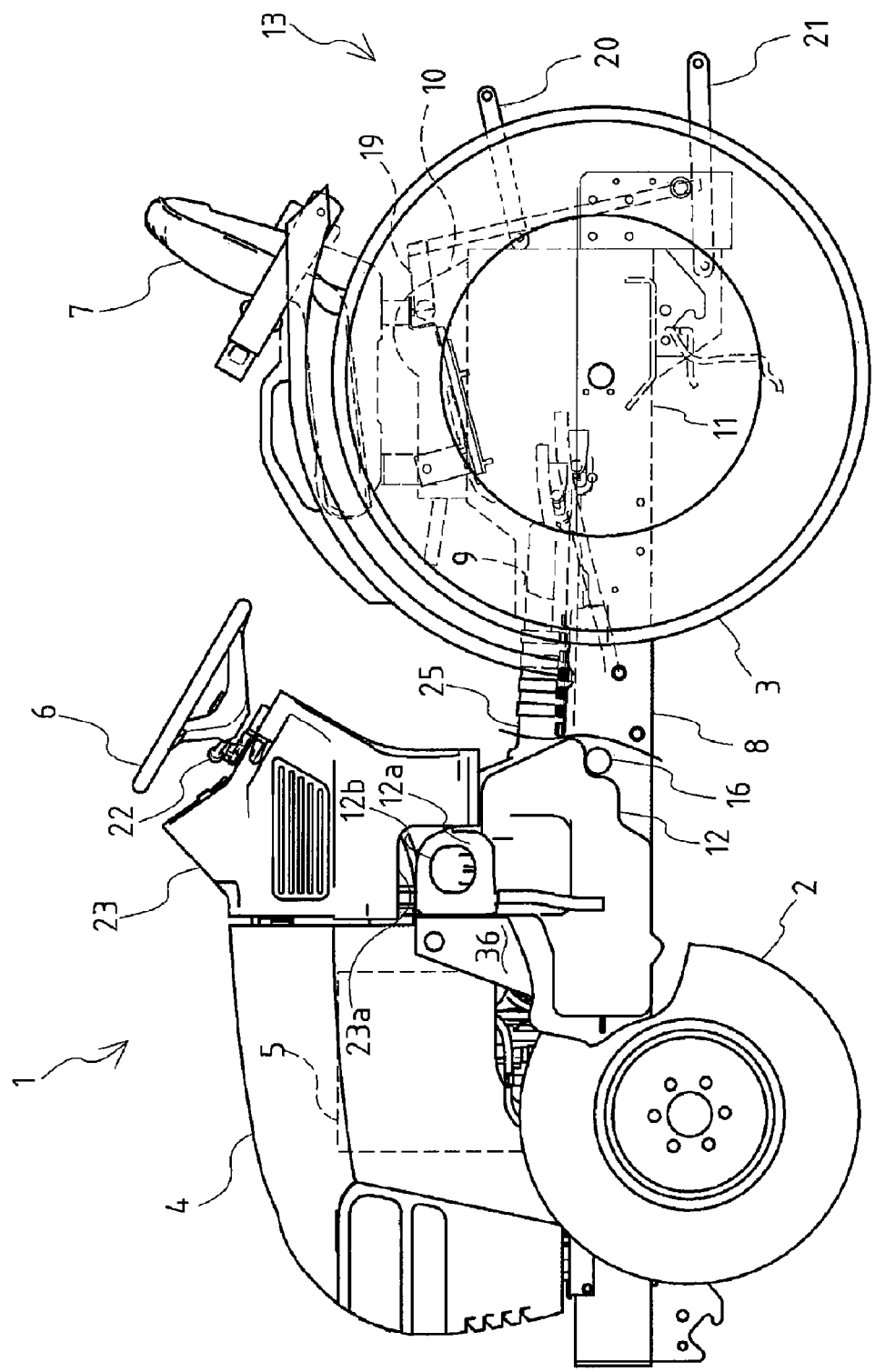
FIG. 3 is a side view of another embodiment of positional relation between a fuel tank 12 and a dashboard 23.
Figure 4:
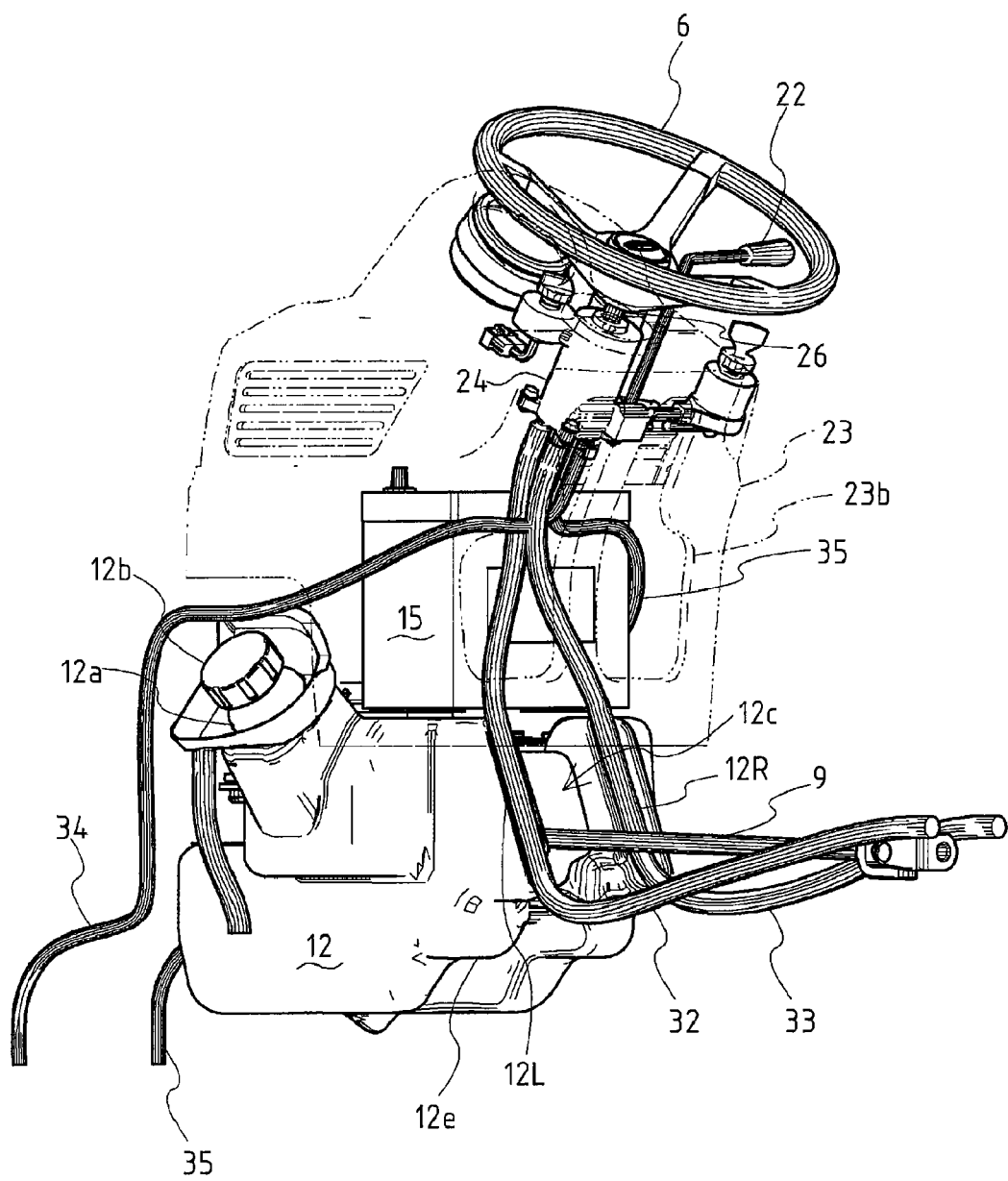
FIG. 4 is a perspective rear view of the vicinity of the fuel tank 12.
Figure 5:
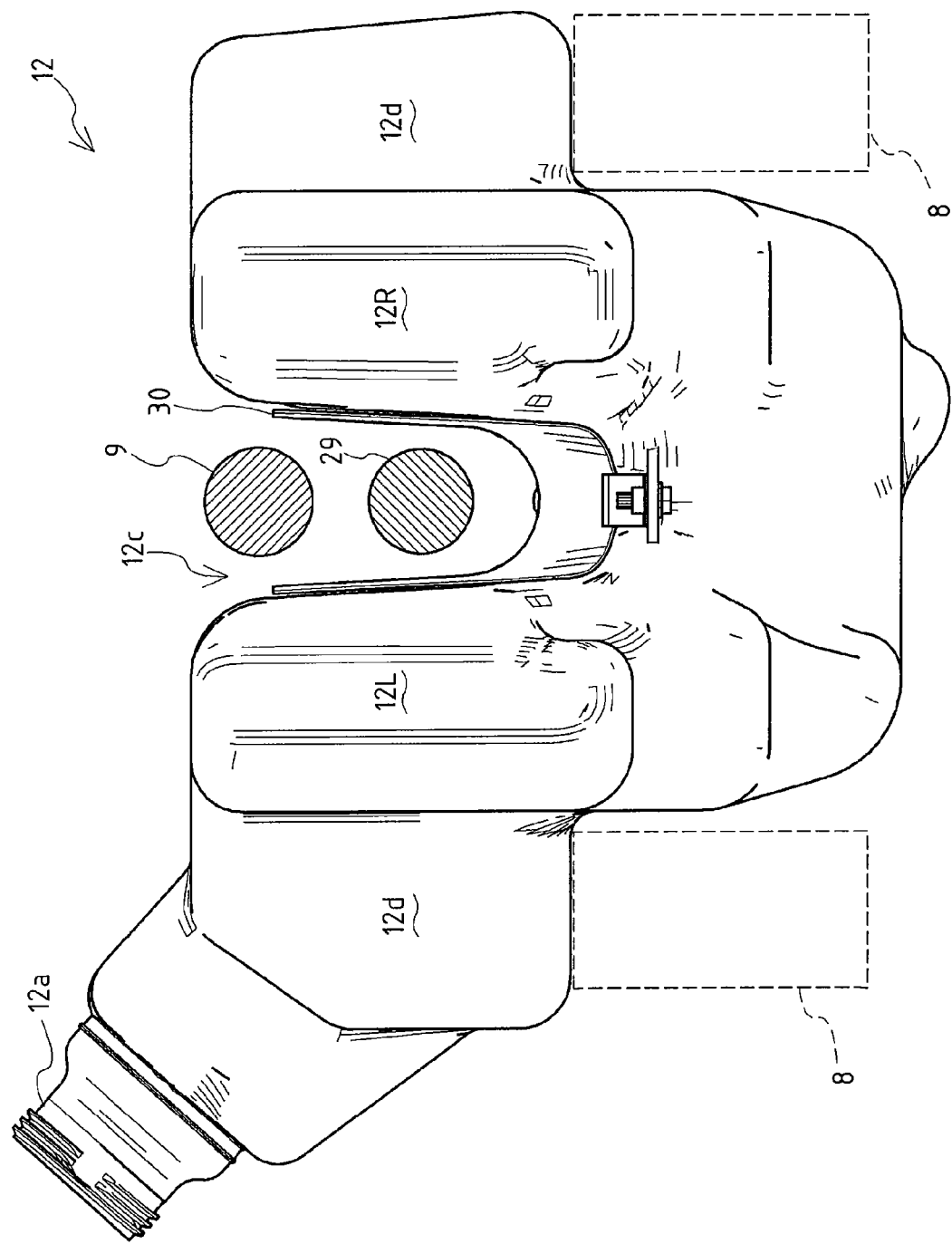
FIG. 5 is a rear view of the fuel tank 12.
Figure 6:
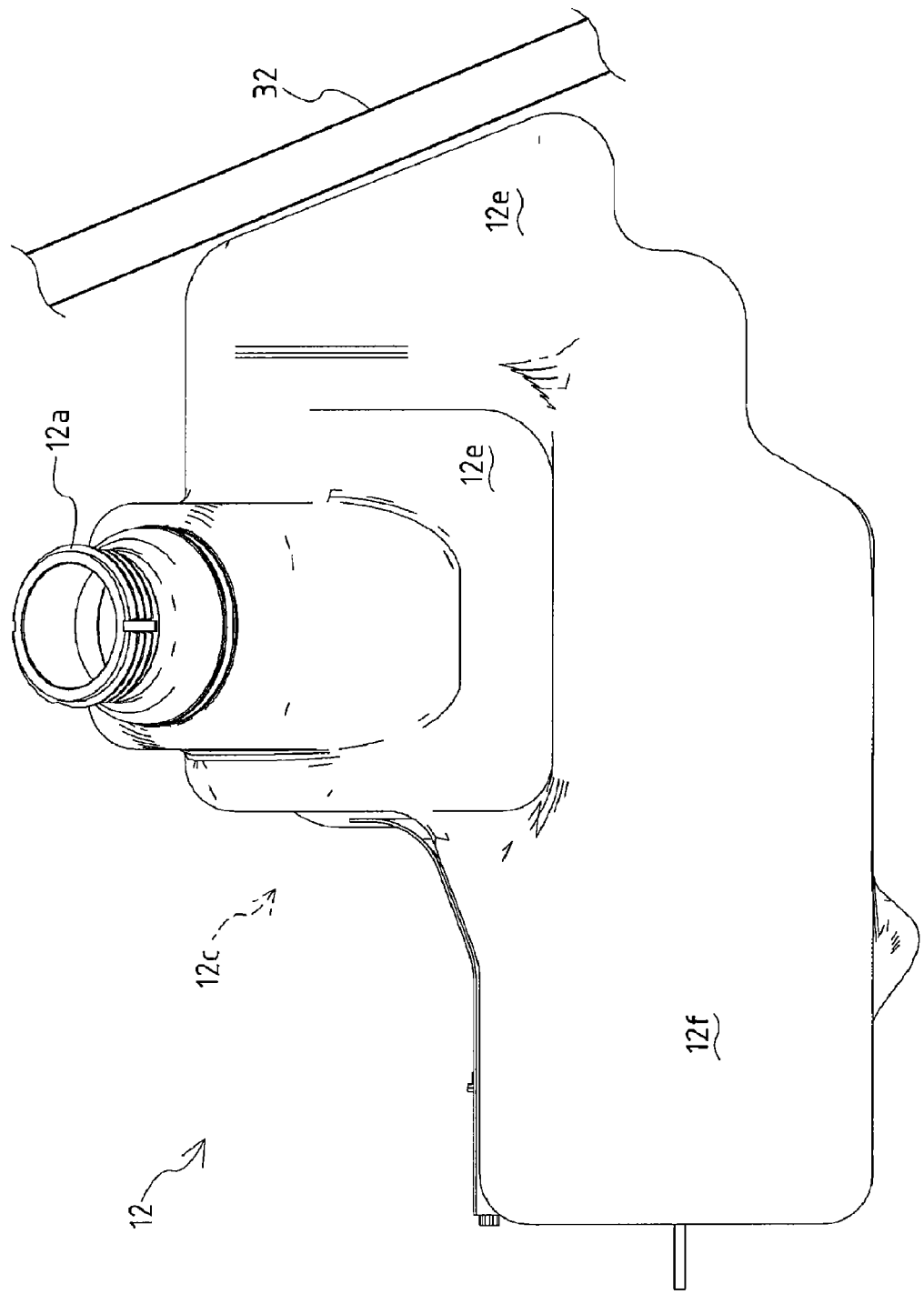
FIG. 6 is a side view of the same.
Figure 7:
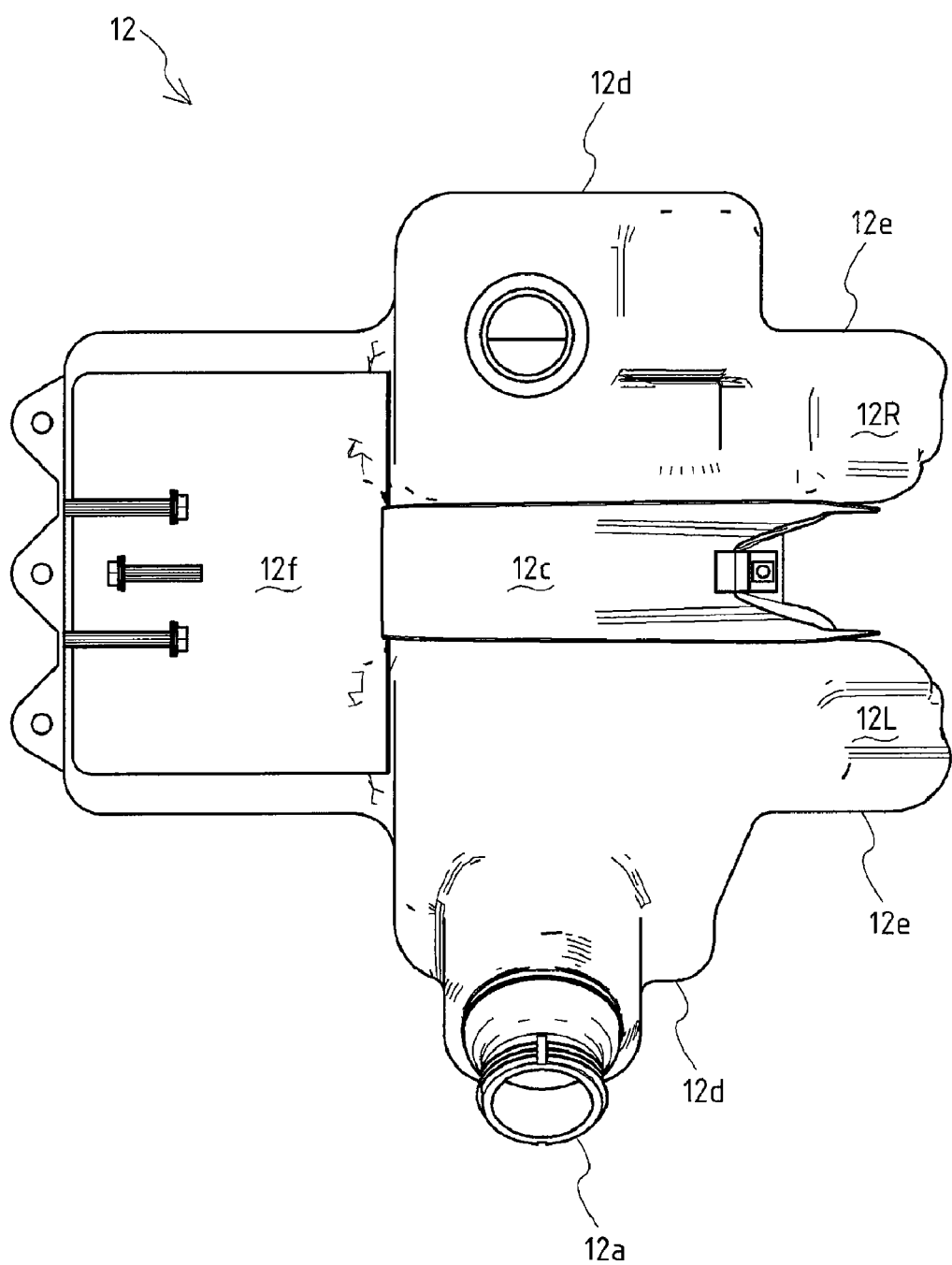
FIG. 7 is a plan view of the same.
Figure 8:
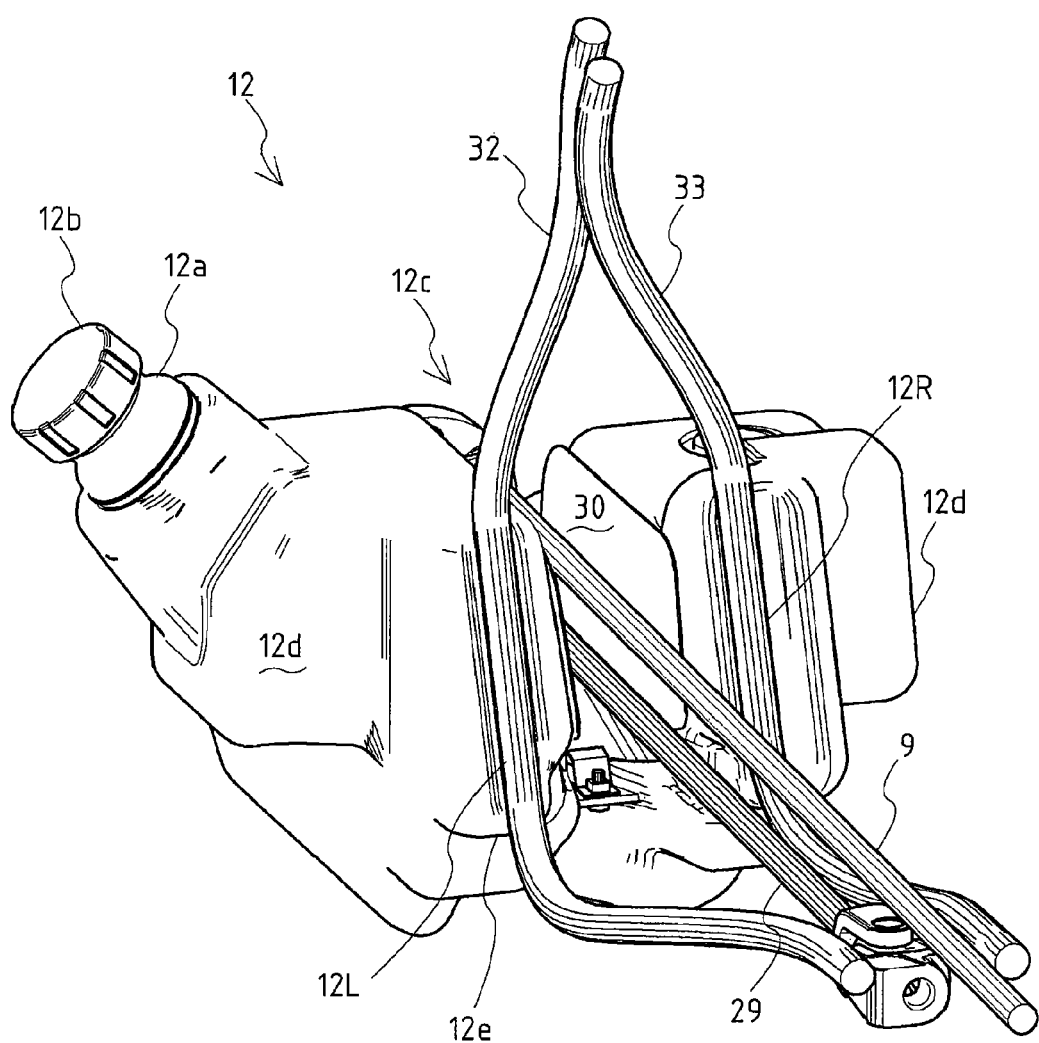
FIG. 8 is a perspective upper rear view of the fuel tank 12.
Figure 9:
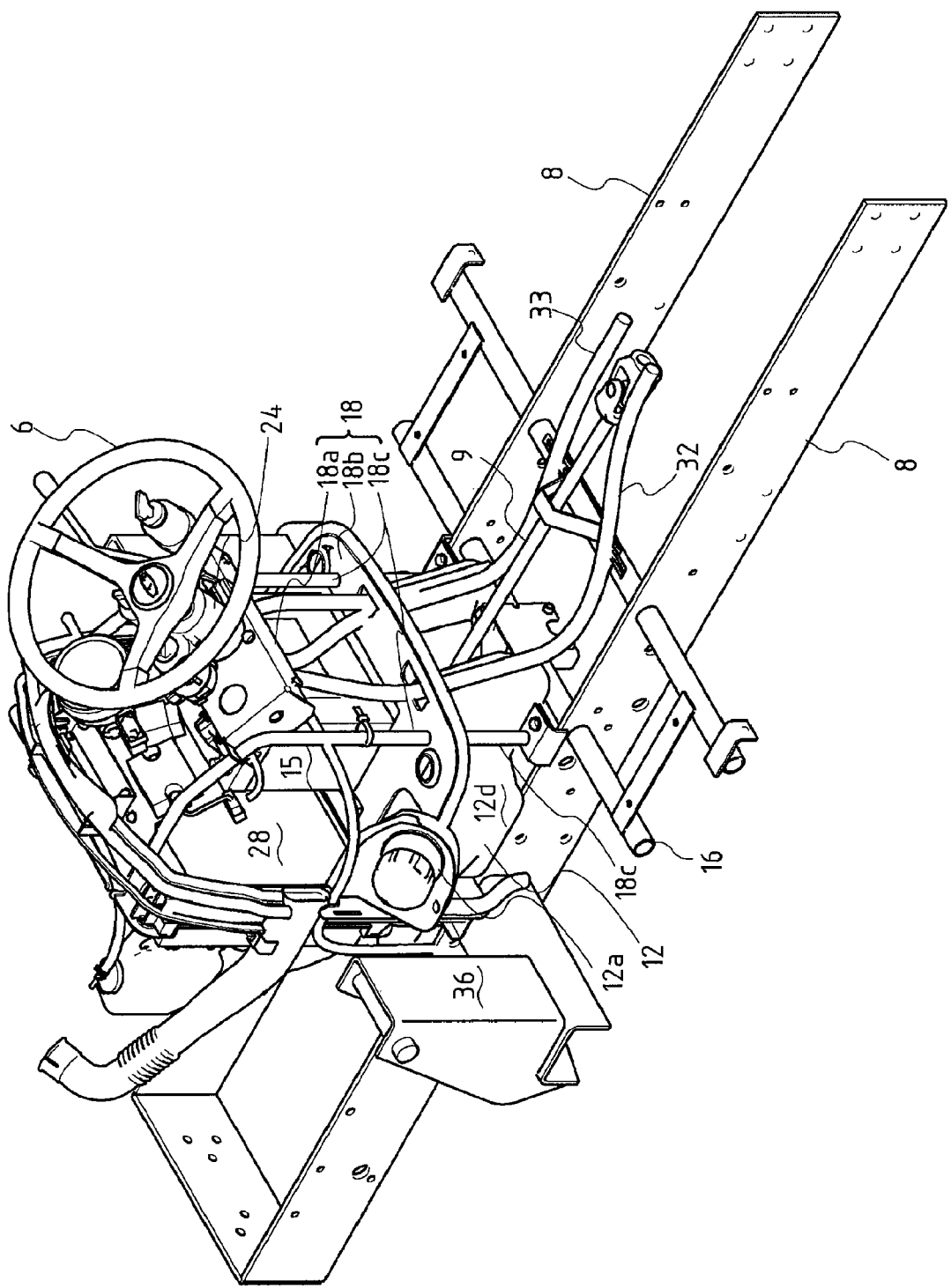
FIG. 9 is a perspective upper rear view of support construction of the fuel tank 12.
Figure 10:
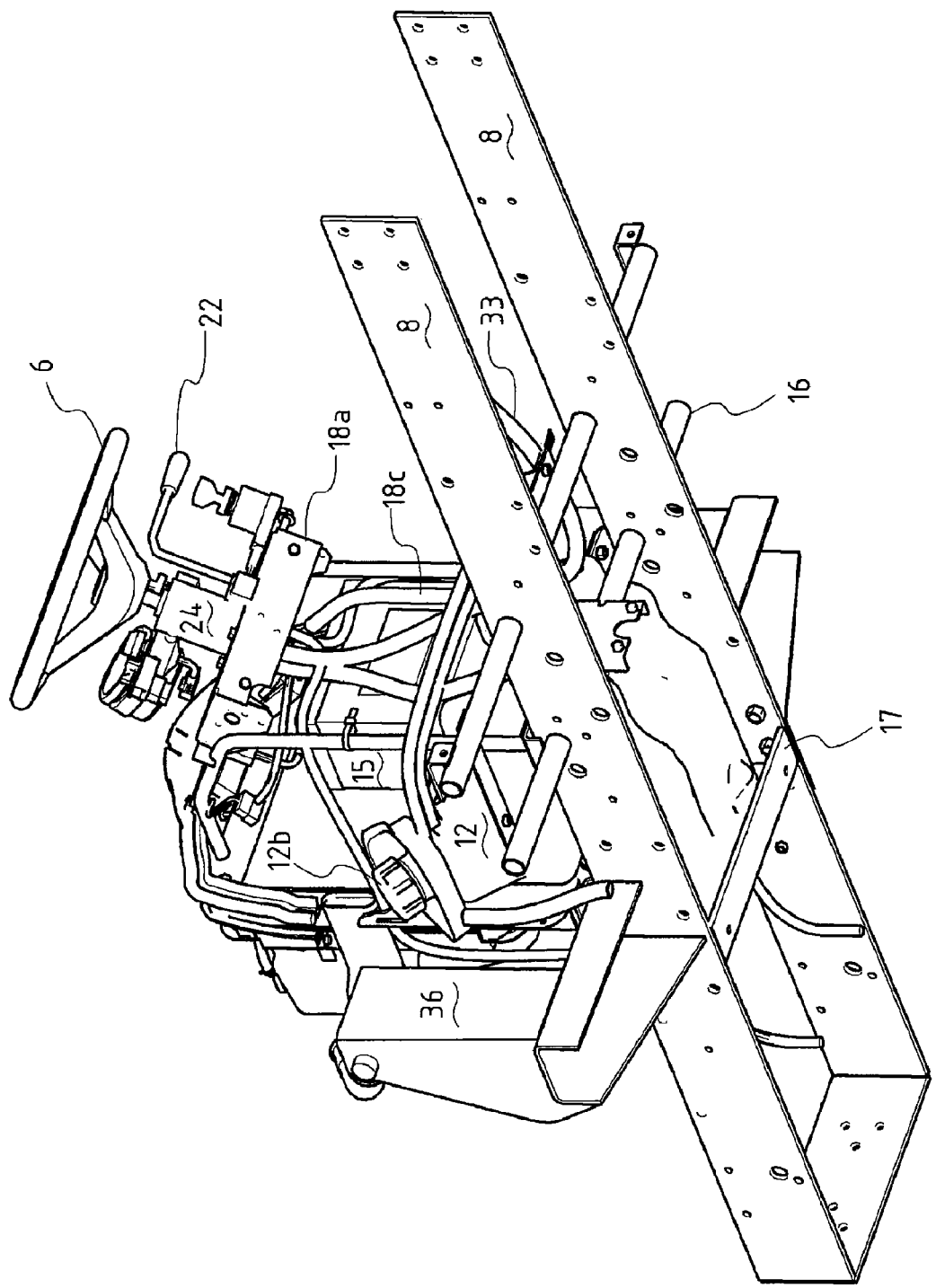
FIG. 10 is a perspective lower rear view of support construction of the fuel tank 12.

FIG. 1 is a left side view of entire construction of a tractor 1 according to an embodiment of a traveling vehicle of the present invention. FIG. 2 is a plan view of the same. FIG. 3 is a side view of another embodiment of positional relation between a fuel tank 12 and a dashboard 23. FIG. 4 is a perspective rear view of the vicinity of the fuel tank 12. FIG. 5 is a rear view of the fuel tank 12. FIG. 6 is a side view of the same. FIG. 7 is a plan view of the same. FIG. 8 is a perspective upper rear view of the fuel tank 12. FIG. 9 is a perspective upper rear view of support construction of the fuel tank 12. FIG. 10 is a perspective lower rearview of support construction of the fuel tank 12.

Firstly, explanation will be given on the entire construction of the tractor 1 according to the embodiment of the traveling vehicle of the present invention.

As shown in FIGS. 1 and 2, with regard to the tractor 1 according to this embodiment, front wheels 2 and rear wheels 3 are disposed at the front and rear portions of the vehicle body. An engine 5 is arranged in a bonnet 4 at the front portion. A later-discussed steering wheel 6 is provided behind the bonnet 4. A seat 7 is disposed behind the steering wheel 6. A main speed change lever and the like are disposed at the side of the seat 7.

The engine 5 is supported on body frames 8 so as to be noise-proofed. A drive shaft 9, a transmission casing 11 and the like are disposed at the rear portion of the engine 5. The driving force of the engine 5 is transmitted through the drive shaft 9 to the transmission casing 11 and changed in speed at the transmission casing 11 to drive the rear wheels 3. Furthermore, the driving force is also transmitted from the transmission casing 11 through a front wheel drive shaft 29 to the front wheels 2.

The driving force of the engine 5 is transmitted to a PTO shaft (not shown) projected from the rear end of the transmission casing 11, and then transmitted from the PTO shaft through an universal joint and the like to drive a working machine (not shown) which is attached through a working machine attachment device 13 arranged at the rear end of the vehicle body. A hydraulic casing 10 is mounted on the upper portion of the transmission casing 11. A hydraulic cylinder is housed in the hydraulic casing 10 to rotate lift arms 19.

The working machine attachment device 13 is a hoist device of three-point link structure comprising a top link 20 and lower links 21. The rotation of the lift arms 19 is transmitted through a lift rod to the lower links 21 to move vertically the working machine attached to the working machine attachment device 13.

A dashboard 23 is provided behind the bonnet 4. The dashboard 23 covers a later-discussed power steering valve 24 and the like. An instrument panel, a key switch, a forward/rearward traveling switching lever 22 and the like are arranged on the dashboard 23. A step cover is disposed from lower rear portion of the dashboard 23 to the side rear portion thereof to form a step 25, and the step 25 is fixed through a stay or the like to the body frames 8.

Next, explanation will be given on the structure inside the dashboard 23.

As shown in FIG. 4, the center portion of the steering wheel 6 is fixed to an upper end of a steering shaft 26, and the lower end of the steering shaft 26 is connected to the input shaft of the hydraulic power steering valve (orbit roll) 24 which is a power steering device.

At the lower portion of the power steering valve 24, a pump port to which pressure oil from the hydraulic pump is supplied, a tank port which drains return oil to the transmission casing 11, and two output ports which send pressure oil to a power steering cylinder arranged at the steering part of the front wheels 2 and receive pressure oil from the power steering cylinder are provided. Hydraulic pipings 32, 33, 34 and 35 are connected respectively to the ports.

Next, explanation will be given on shape of a fuel tank 12 which supplies fuel to the engine 5.

The fuel tank 12 is constructed by resin, stainless steel or the like, and is a container substantially V-like shaped when viewed from the rear as shown in FIGS. 4 to 8. In other words, a groove 12c is formed longitudinally at a substantial lateral center of an upper surface of a container substantially box-like shaped, and the bottom of the groove 12c is positioned at the substantial vertical center of the fuel tank 12 to have enough height and width to house the drive shaft 9 and the front wheel drive shaft 29. In addition, the size of the groove 12c is set so that the fuel tank 12 has enough rigidity not to distort by providing the groove 12c.

Bulking parts 12d bulking outward laterally are provided at both sides of the groove 12c of the fuel tank 12, and the outer surfaces of the bulking parts 12d are positioned inside the side surfaces of the dashboard 23. Namely, the lateral width of the fuel tank 12 is adjusted to the lateral width of the dashboard 23. The lateral width of the fuel tank 12 is set so that the fuel tank 12 can be interposed between the left and right body frames 8. Namely, the lateral width of the fuel tank 12 is in agreement with the distance between the left and right body frames 8. Then, as shown in FIGS. 5 and 9, the lower surfaces of the bulking parts 12d are mounted on the body frames 8, whereby the fuel tank 12 is supported.

Then, as shown in FIGS. 4 to 8, a fuel filler 12a of the fuel tank 12 is formed to extend leftward and upward from the outer upper portion of one of the bulking parts 12d, concretely from the outer upper portion of the bulking part 12d of the left side. The fuel filler 12a is covered by a cap 12b or the like.

A cover 30 substantially U-like shaped is fixed to the inner peripheral surface of the groove 12c to improve the intensity of the fuel tank 12.

As mentioned above, the groove 12c is formed along the longitudinal direction of the tractor 1. A part of the drive shaft 9 transmitting driving force of the engine 5 to the transmission casing 11 and a part of the front wheel drive shaft 29 transmitting driving force from the transmission casing 11 to the front wheels 2 are received in the groove 12c.

In this embodiment, as shown in FIG. 8, the drive shaft 9 passes longitudinally horizontally through the upper portion of the groove 12c, and the front wheel drive shaft 29 passes longitudinally horizontally through the lower portion of the groove 12c. However, the construction is not limited thereto. It may alternatively be constructed that only the drive shaft 9 passes through the groove 12c and the front wheel drive shaft 29 passes at the side of the fuel tank 12.

As shown in FIGS. 4 to 8, both sides of the groove 12c of the fuel tank 12 are bulked rearward to form rear bulking parts 12e. The rear surfaces of the rear bulking parts 12e are slanted downward so as to be adjusted to the shape of the dashboard 23. Furthermore, hydraulic piping grooves 12L and 12R are formed vertically respectively in the lateral centers of the rear surfaces of the rear bulking parts 12e. The hydraulic piping 32 supplying pressure oil from the hydraulic pump and the hydraulic piping 33 draining return oil to the transmission casing 11, each of them connected to the lower surface of the power steering valve 24, are positioned in the hydraulic piping grooves 12L and 12R.

As mentioned above, in this embodiment, the rear surface of the fuel tank 12, particularly the rear surfaces of the rear bulking parts 12e are slanted from the upper front portions to the lower rear portions. Accordingly, the rear surface of the fuel tank 12 is slanted from the upper front portions to the lower rear portions so that the hydraulic pipings 32 and 33 are guided smoothly from the power steering valve 24 above the fuel tank 12 to the hydraulic casing 10 behind the fuel tank 12.

Furthermore, the lower front portion of the fuel tank 12 is bulked forward to form a bulking part 12f, and a radiator 28 is arranged above the bulking part 12f. Namely, the space below the radiator 28 is used to increase the capacity of the fuel tank 12.

Accordingly, the left and right lower portions of the fuel tank 12 are communicated with each other so that fuel is not inclined to one side when the vehicle body is inclined laterally, whereby fuel is supplied to the engine even if the amount of fuel is little. The drain is provided at the center of lower portion of the fuel tank so that all of fuel can be discharged. The bulking part 12f is provided at the lower front portion of the fuel tank 12 so that the center of gravity is moved downward and stabilized. Though the bulking parts 12d are provided at the left and right sides of the upper portion of the fuel tank 12 and the rear bulking parts 12e are provided at the rear portion thereof, the groove 12c is provided at the lateral center of the upper portion thereof so as to divide into left and right portions, whereby incline of fuel is dispersed even if the vehicle body is shaken laterally to improve stability.

Next, explanation will be given on the method to dispose the fuel tank 12.

As shown in FIGS. 4, 9 and 10, the fuel tank 12 is fixed through a later-discussed column bracket 18 to the body frames 8 to be below the power steering valve 24 and below and before the dashboard 23. As shown in FIG. 1, in this embodiment, a part (upper rear portion) of the fuel tank 12 is covered by the lower front portion of the dashboard 23. In addition, the lower portion of the dashboard 23 is lower than the vertical center of the dashboard 23.

Herein, as shown by another embodiment in FIG. 3, it may alternatively be constructed that the fuel tank 12 does not overlap the dashboard 23 when viewed from the side. Namely, the fuel tank 12 is disposed below the dashboard 23. The height of the lower portion of the dashboard 23 and the upper portion of the step 25 is increased, and the fuel tank 12 is contracted vertically and extended longitudinally, or a later-discussed notch 23a is enlarged to prevent the overlap.

As mentioned above, in this embodiment, the power steering valve 24 is fixed to a later-discussed upper attachment part 18a of the column bracket 18.

The column bracket 18 comprises the upper attachment part 18a, a middle attachment part 18b and a pair of left and right pipe parts 18c. Each of the pipe parts 18c is bent to be substantially turned L-like shaped when viewed from the side, and the upper portion of the front end thereof is fixed to a radiator bracket standingly provided therebefore and the lower end thereof is fixed to the body frame 8. The upper attachment part 18a is substantially box-like shaped and fixed to the upper rear portions of the pipe parts 18c to be fixed thereto with the power steering valve 24, an operation panel and the like.

The middle attachment part 18b is a plate arranged horizontally at the vertical middle portions of the pipe parts 18c to be mounted thereon with a battery 15. The radiator 28, an oil cooler and electric members such as a relay before the battery 15 are fixed to the pipe parts 18c.

The lower portion of the column bracket 18 is fixed through a stay or the like to the body frames 8 and supported so that the fuel tank 12 is positioned at the substantial lateral center of the left and right body frames 8 when viewed from above. The fuel tank 12 is positioned between the engine 5 and the seat 7 in the longitudinal direction of the vehicle body.

Accordingly, by attaching the column bracket 18 to the body frames 8, the fuel tank 12, the battery 15, the radiator 28, the oil cooler and the electric members such as a relay are fixed to the body frames 8. In this case, the battery 15 is disposed substantially above the fuel tank 12 and positioned before and downward from the steering wheel 6 and the power steering valve 24.

As shown in FIGS. 9 and 10, the lower portion of the fuel tank 12 is supported by support members 16 and 17 that are fixed laterally or longitudinally to the body frames 8. In addition to supporting the fuel tank 12, the support members 16 and 17 also reinforce the body frames 8.

In detail, the lower surface of the front portion of the fuel tank 12 is supported by the support member 17, and the rear portion of the fuel tank is supported by the support member 16 at the lower surfaces of the rear bulking parts 12e. Namely, the lower end of the fuel tank 12 is positioned below the support member 16, and the lower portion of the fuel tank 12 overlaps the support member 16 when viewed from the rear.

In this embodiment, the lower surface of the front portion of the fuel tank 12 is supported by the platy support member 17, and the rear portion of the fuel tank 12 is supported by the tubular support member 16. However, the construction is not limited thereto. It may alternatively be constructed that the fuel tank 12 is supported by the body frames 8 through a stay, a vibration-proof support member or the like.

An intake port 23b through which outside air can pass is formed in the rear surface of the dashboard 23. The shape of the intake port 23b is not limited, and an intake port may be shaped in the rear surface of the dashboard 23 by punching.

With regard to the conventional traveling vehicle such as a tractor, air is generally inhaled through a front surface of a bonnet, and a radiator and a battery are generally arranged before an engine and the radiator, the battery, a power steering valve and the like are generally fixed independently to a body frame. However, with regard to this embodiment, air is introduced from behind the vehicle body so that the radiator, the battery, the power steering valve and the like can be arranged at the rear portion of the vehicle body intensively, whereby the number of parts is reduced to reduce number of processes of assembly and maintenance.

As shown in FIGS. 1 and 3, a part (rear portion) of the fuel tank 12 overlaps the step 25 when viewed from the side, above, front or rear. Namely, the front portion of the step 25 overlaps the rear portion of the vertical middle portion of the fuel tank 12 when viewed from the side. As shown in FIG. 2, the substantial lateral center of the front end of the step 25 is recessed rearward and the lower portion of the dashboard 23 positions at the recessed part, whereby the fuel tank 12 is disposed.

As shown in FIG. 4, the fuel filler 12a of the fuel tank 12 extends leftward and upward from the upper portion of one of left and right sides of the fuel tank 12, concretely from the left surface, and is covered by the cap 12b or the like. The notch 23a is formed in the lower front portion of the side surface of the dashboard 23, and the fuel filler 12a positions at the notch 23a. Accordingly, an operator can mount an oil feeding tank on the step 25 and remove the cap 12b to supply fuel to the fuel tank 12 easily.

As shown in FIGS. 1 and 3, the fuel filler 12a of the fuel tank 12 is positioned below the vertical middle portion of the dashboard 23. The fuel filler 12a is disposed before the longitudinal middle portion of the dashboard 23 to not interfere with the battery 15 and the hydraulic pipings 32, 33, 34 and 35 disposed in the dashboard 23.

As mentioned above, the fuel filler 12a extends leftward and upward from the upper portion of one of left or right sides of the fuel tank 12, concretely from the left surface, and is positioned directly above the step 25.

As shown in FIGS. 1 and 9, brackets 36 to which a front loader (not shown) is attached are fixed to the sides of the front portions of the body frames 8. The fuel filler 12a is disposed substantially before the brackets 36.

With regard to the traveling vehicle 1 comprising the engine 5 supported on the body frames 8 and the fuel tank 12 between the engine 5 and the seat 7 for supplying fuel, the fuel tank 12 is disposed below the steering wheel 6 and below the vertical middle portion of the dashboard 23.

Accordingly, the space in the lower portion of the dashboard 23 or below the dashboard 23 can be used effectively. The fuel tank 12 can be arranged at the comparative low position without lowering the minimum ground clearance of the traveling vehicle 1, whereby fuel can be supplied easily from an oil supply tank to the fuel tank 12.

A part or all of the fuel tank 12 is covered by a part of the dashboard 23 when viewed from the side.

Accordingly, the space in the lower portion of the dashboard 23 or below the dashboard 23 can be used effectively. The fuel tank 12 can be arranged at the comparative low position without lowering the minimum ground clearance of the traveling vehicle I, whereby fuel can be supplied easily from an oil supply tank to the fuel tank 12.

The fuel tank 12 is positioned directly below the dashboard 23.

Accordingly, the space in the lower portion of the dashboard 23 or below the dashboard 23 can be used effectively. The fuel tank 12 can be arranged at the comparative low position without lowering the minimum ground clearance of the traveling vehicle 1, whereby fuel can be supplied easily from an oil supply tank to the fuel tank 12.

A part or all of the fuel tank 12 is covered by the front portion of the step 25 of the traveling vehicle 1 when viewed from the side.

Accordingly, fuel can be supplied to the fuel tank 12 while an oil supply tank is placed on the step 25 so that the height to which the oil supply tank is lifted up is lower than that which is required with the conventional construction, whereby the manpower is reduced and the oil supply work becomes easy. Furthermore, interference from an obstacle to the side surface of the fuel tank is prevented by the step 25.

With regard to the traveling vehicle 1 comprising the engine 5 supported on the body frames 8 and the fuel tank 12 for supplying fuel to the engine 5 wherein cooling air is introduced from the behind the vehicle, the intake port 23b is formed in the rear surface of the dashboard 23, the power steering valve 27 is connected to the steering wheel 6, and the fuel tank 12 and the battery 15 are disposed below the power steering valve 27.

Accordingly, since cooling air is introduced from the behind the vehicle, the fuel tank, the power steering valve and the battery are cooled simultaneously with the engine to prevent the temperature from rising. Since a radiator or the like is arranged between the engine and the fuel tank, a partition member arranged therebetween can be constructed easily or can be omitted.

With regard to the traveling vehicle 1 comprising the engine 5 supported on the body frames 8 and the fuel tank 12 between the engine 5 and the seat 7 for supplying fuel, the fuel tank 12 is disposed below the steering wheel 6 and the fuel filler 12a of the fuel tank 12 is disposed below the vertical middle portion of the dashboard 23.

Accordingly, the height to which the oil supply tank has to be lifted up is lower than that which is required with the conventional construction, whereby the manpower is reduced and the oil supply work becomes easy.

The fuel filler 12a is positioned directly above the step 25.

Accordingly, fuel can be supplied to the fuel tank 12 while an oil supply tank is placed on the step 25 so that the height to which the oil supply tank is lifted up is lower than that which is required with the conventional construction, whereby the manpower is reduced and the oil supply work becomes easy. Furthermore, interference from an obstacle to the side surface of the fuel tank is prevented by the step 25.

The fuel filler 12a is disposed before the longitudinal middle portion of the dashboard 23.

Accordingly, the fuel filler 12a, which extends from the fuel tank 12, does not interfere with the battery 15 and the hydraulic pipings 32, 33, 34 and 35 disposed in the dashboard 23.

The opening part 23a for the fuel filler 12a is provided in the dashboard 23.

Accordingly, fuel can be supplied to the fuel tank 12 while an oil supply tank is placed on the step 25 so that the height to which the oil supply tank is lifted up is lower than that which is required with the conventional construction, whereby the manpower is reduced and the oil supply work becomes easy. Furthermore, interference from an obstacle to the side surface of the fuel tank is prevented by the step 25.

The fuel filler 12a is disposed before the brackets 36 for a front loader.

Accordingly, the front loader does not interfere with a boom at the time of attaching the front loader or lifting down the front loader to the lowest position. Furthermore, the fuel filler 12a is hidden behind the brackets 36 when viewed from the front so that an obstacle, for example, a tree, in front of the vehicle is prevented from touching the fuel filler 12a while traveling.

With regard to the traveling vehicle 1 comprising the engine 5 and the fuel tank 12 for supplying fuel, the fuel tank 12 is disposed between the engine 5 and the seat 7 and below the steering wheel 6, and the groove 12c is provided longitudinally at the substantial lateral center of the fuel tank 12. Accordingly, the fuel tank 12 can be arranged at the comparative low position without making the fuel tank 12 interfere with the drive shaft 9 and without lowering the minimum ground clearance of the traveling vehicle 1, whereby fuel can be supplied while a fuel supply tank is placed on the step 25 so that fuel supply work to the fuel tank 12 becomes easy.

The power steering valve 24 is attached to the lower portion of the steering wheel 6, and the grooves 12L and 12R in which the hydraulic pipings 32 and 33 connected to the power steering valve 24 are arranged is formed in the fuel tank 12. Accordingly, number of support members fixing the hydraulic pipings 32 and 33 is reduced, whereby the number of parts is reduced.

The power steering valve 24 is attached to the lower portion of the steering wheel 6, and the rear surface of the fuel tank 12 is slanted from the upper front portions to the lower rear portions. Accordingly, the hydraulic pipings 32 and 33 are guided smoothly from the power steering valve 24 above the fuel tank 12 to the hydraulic casing 10 behind the fuel tank 12.

The lower surface of the fuel tank 12 is supported by the support members 16 and 17 hanged laterally on the body frames 8. Accordingly, the support members 16 and 17 reinforce the body frames 8 while supporting the fuel tank 12, whereby the number of parts is reduced.

A part or all of the support member 16 overlaps a part or all of the rear surface of the fuel tank 12 when viewed from the rear. Accordingly, the fuel tank 12 is prevented from moving rearward.

The extending parts 12d are formed leftward and rightward from the side surfaces of the fuel tank 12, and the lower surfaces of the extending parts 12d are supported by the body frames 8. Accordingly, it is not necessary to provide any separate support members for the fuel tank in the bonnet 4, which prevents any support member from interfering with the other members in the bonnet 4, whereby the degree of freedom of design inside the bonnet 4 is improved.

INDUSTRIAL APPLICABILITY

The present invention provides a construction in which fuel can be supplied to a fuel tank while mounting an oil supply tank on a step without lowering minimum ground clearance of a traveling vehicle by using effectively a space in a lower portion of a dashboard and below the dashboard.

The invention claimed is:

1. A traveling vehicle comprising:
a body frame including right and left parts having a space therebetween;
an engine supported on the body frame;
a seat mounted on the body frame;
a dashboard disposed above the body frame between the engine and the seat, wherein an opening is provided in a lower half area of a right or left side surface of the dashboard;
a steering wheel provided on the dashboard; and
a fuel tank for supplying fuel to the engine, wherein the fuel tank includes a main part, a bulking part extended rightwardly or leftwardly outward from the main part, and a fuel filler projecting from the bulking part, and wherein the fuel tank is disposed between the engine and the seat and below the steering wheel so that the main part of the fuel tank is disposed between the right and left parts of the body frame, so that a lower surface of the bulking part of the fuel tank is supported by the right or left part of the body frame, and so that the fuel filler of the fuel tank is disposed to project outward through the opening of the dashboard.

2. The traveling vehicle as set forth in claim 1, further comprising:
a step disposed above the body frame between the dashboard and the seat, wherein the fuel filler is positioned immediately above the step.

3. The traveling vehicle as set forth in claim 1, wherein the opening of the dashboard having the fuel filler projecting outward therethrough is disposed in a front half area of the lower half area of the right or left side surface of the dashboard.

4. The traveling vehicle as set forth in claim 1, further comprising:
a bracket for supporting a front loader, wherein the opening of the dashboard having the fuel filler projecting outward therethrough is disposed behind the bracket.

5. The traveling vehicle as set forth in claim 1, wherein a groove is provided at a substantial lateral center of the main part of the fuel tank so as to have a driving shaft passed forward and backward therethrough.

6. The traveling vehicle as set forth in claim 1, further comprising:
a power steering valve attached to a lower portion of the steering wheel, wherein the fuel tank is formed with a groove in which a hydraulic piping connected to the power steering valve is arranged.

7. The traveling vehicle as set forth in claim 1, further comprising:
a power steering valve attached to a lower portion of the steering wheel, wherein a rear surface of the fuel tank is slanted from an upper front portion to a lower rear portion along a hydraulic piping connected to the power steering valve.

8. The traveling vehicle as set forth in claim 1, wherein a lower surface of a part of the main part of the fuel tank is supported by a support member extended laterally between the right and left parts of the body frame.

9. The traveling vehicle as set forth in claim 8, wherein the part of the main part of the fuel tank that is supported by the support member extends rearward, wherein a bottom end of the fuel tank is lower than the lower surface of the part of the main part of the fuel tank that is supported by the support member, and wherein the bottom end of the fuel tank is disposed between the right and left parts of the body frame so that the support member intersects a rear surface of the fuel tank between the right and left parts of the body frame when viewed in rear.

10. The traveling vehicle as set forth in claim 5, wherein the fuel tank includes another bulking part extended leftwardly or rightwardly outward from the main part so as to be disposed laterally opposite to the bulking part having the fuel filler so that the lower surfaces of the right and left bulking parts of the fuel tank are supported by the respective right and left parts of the body frame.

11. The traveling vehicle as set forth in claim 1, wherein a part or whole of the fuel tank is covered by the lower half area of the right or left side surface of the dashboard having the opening when viewed in side.

12. The traveling vehicle as set forth in claim 1, wherein the fuel tank is positioned immediately below a bottom end of the right or left side surface of the dashboard.

13. The traveling vehicle as set forth in claim 1, further comprising:
a step disposed above the body frame between the dashboard and the seat, wherein a front portion of the step is disposed to intersect the fuel tank when viewed in side.

14. The traveling vehicle as set forth in claim 1, wherein the dashboard has a rear surface at a rear end of the right or left side surface thereof, and wherein an intake port is formed in the rear surface of the dashboard so as to introduce a cooling air for cooling the engine in the bonnet forward from a space in rear of the rear surface of the dashboard.

15. The traveling vehicle as set forth in claim 14, further comprising:
   a power steering valve disposed in the dashboard and connected to the steering wheel, wherein the fuel tank is disposed below the power steering valve.

16. The traveling vehicle as set forth in claim 15, further comprising:
   a battery disposed in the dashboard below the power steering valve and above the fuel tank.

17. The traveling vehicle as set forth in claim 1, wherein the fuel tank includes a front part which is extended forward to be disposed below a radiator.

* * * * *